US011586740B2

(12) United States Patent
Ramesh et al.

(10) Patent No.: US 11,586,740 B2
(45) Date of Patent: Feb. 21, 2023

(54) DETECTING SECOND-ORDER SECURITY VULNERABILITIES IN LIBRARIES

(71) Applicant: Oracle International Corporation, Redwood Shores, CA (US)

(72) Inventors: Raghavendra Ramesh, Runcorn (AU); Nicholas John Allen, Westlake (AU); Yang Zhao, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 204 days.

(21) Appl. No.: 17/163,193

(22) Filed: Jan. 29, 2021

(65) Prior Publication Data

US 2022/0245257 A1    Aug. 4, 2022

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
CPC . G06F 21/577; G06F 2221/033; G06F 21/563
See application file for complete search history.

(56) References Cited

U.S. PATENT DOCUMENTS

| 10,789,362 | B2 | 9/2020 | Allen et al. | |
|---|---|---|---|---|
| 2009/0094588 | A1* | 4/2009 | Chipman | G06F 9/4488 717/141 |
| 2010/0325620 | A1* | 12/2010 | Rohde | G06F 11/3604 717/154 |
| 2013/0167239 | A1* | 6/2013 | Amit | H04L 63/1433 726/25 |
| 2020/0043098 | A1* | 2/2020 | Patil | G06Q 30/0201 |
| 2020/0195686 | A1* | 6/2020 | Johns | G06F 16/221 |

FOREIGN PATENT DOCUMENTS

CN    107704377 A  *  2/2018  .......... G06F 11/3636

OTHER PUBLICATIONS

Yan et al. (NPL: Detection Method of the Second-Order SQL Injection in Web Applications, Proceedings of the Third International Workshop on Structured Object-Oriented Formal Language and Method; Springer-Verlag New York, Inc., New York, NY, USA; pp. 154-165; Feb. 21, 2014 (12 pages)) (Year: 2014).*

(Continued)

*Primary Examiner* — Meng Li
(74) *Attorney, Agent, or Firm* — Ferguson Braswell Fraser Kubasta PC

(57) ABSTRACT

A method for executing a second-order taint analysis on library code may include generating, by executing a first-order taint analysis on the library code starting at a sink, a first execution path from a load instruction to the sink. The load instruction may perform: reading a first value using a first global identifier. The method may further include determining a store instruction by matching the load instruction and the store instruction. The store instruction may perform: writing a second value using a second global identifier. The method may further include, generating a second execution path from the store instruction to the load instruction, generating, by executing the first-order taint analysis on the library code starting at the store instruction, a third execution path from an entry point to the store instruction, and forming a potential second-order taint flow by joining the first, second, and third execution paths.

20 Claims, 8 Drawing Sheets

(56) References Cited

OTHER PUBLICATIONS

Dahse et al. (NPL: "Static Detection of Second-Order Vulnerabilities in Web Applications", the Proceedings of the 23rd USENIX Security Symposium. Aug. 20-22, 2014 • San Diego, CA ISBN 978-1-931971-15-7) (Year: 2014).*
Ali, K. et al. "AVERROES: Whole-program Analysis without the Whole Program"; In European Conference on Object Oriented Programming (ECOOP), pp. 378-400, Springer, 2013. (24 pages).
Cortesi, A. et al.; "Combining Symbolic and Numerical Domains for Information Leakage Analysis"; Trans. Computational Science, 31:98-135, 2018 (38 pages).
Dagenais, B. et al.; "Enabling Static Analysis for Partial Java Programs"; In Proceedings of the 23rd ACM SIGPLAN Conference on Object-Oriented Programming Systems Languages and Applications, OOPSLA' 08; pp. 313-328, ACM 2008 (16 pages).
Gopan, D. et al.; "Low-level Library Analysis and Summarization"; In Werner Damm and Holger Hermanns, Editors, Computer Aided Verification; pp. 68-81, Berlin, Heidelberg 2007, Springer Berlin Heidelberg (14 pages).
Midtgaard, J. et al.; "A Structural Soundness Proof for Shivers's Escape Technique: A Case for Galois Connections"; In Static Analysis Symposium (SAS), No. 7460 in Lecture Notes in Computer Science, pp. 352-369, Springer 2012 (18 pages).
Reps, T. W. et al.; "Precise Interprocedural Dataflow Analysis via Graph Reachability"; In Ron K. Cytron and Peter Lee, Editors, Conference Record of POPL '95: 22nd ACM SIGPLAN-SIGACT Symposium on Principles of Programming Languages, San Francisco, California, USA, Jan. 23-25, 1995; pp. 49-61, ACP Press, 1995 (14 pages).
Tang, H. et al.; "Conditional Dyck-cfl Reachability Analysis for Complete and Efficient Library Summarization"; In Hongseok Yang, Editor, Programming Languages and Systems, pp. 880-908, Berlin, Heidelberg, 2017. Springer Berlin Heidelberg (27 pages).
Allen, N. et al.; "Combining Type-Analysis with Points-To Analysis for Analyzing Java Library Source-Code"; In Proceedings of the 4th ACM SIG-PLAN International Workshop on State of the Art in Program Analysis; SOAP Jun. 14, 2015, Portland OR, USA, pp. 13-18 (6 pages).

* cited by examiner

DETECTING SECOND-ORDER SECURITY VULNERABILITIES IN LIBRARIES

BACKGROUND

Library code includes multiple entry points (e.g., public application programming interface (API) methods) which may be invoked by an application. Hence, a precise flow-sensitive static taint analysis (which precisely models execution order) to detect second-order security vulnerabilities needs to consider combinations of multiple execution paths. For example, in a second-order security vulnerability, one invocation of a library function by an application may store tainted data in a database, and a subsequent library function invocation by the application may read the tainted data from the database and use the tainted data in a security sensitive operation (e.g., in a Structured Query Language (SQL) query, resulting in an SQL injection vulnerability). A conventional flow-sensitive whole-program static analysis that analyzes the library code would fail to detect such second-order security vulnerabilities because there is no direct control flow between the different library functions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for executing a second-order taint analysis on library code, including generating, by executing a first-order taint analysis on the library code starting at a sink, a first execution path from a load instruction to the sink. The load instruction performs: reading a first value using a first global identifier. The library code includes entry points. The method further includes determining a store instruction by matching the load instruction and the store instruction. The store instruction performs: writing a second value using a second global identifier. The method further includes in response to matching the load instruction and the store instruction, generating a second execution path from the store instruction to the load instruction, generating, by executing the first-order taint analysis on the library code starting at the store instruction, a third execution path from an entry point to the store instruction, and forming a potential second-order taint flow by joining the first execution path, the second execution path, and the third execution path.

In general, in one aspect, one or more embodiments relate to a system including a computer processor, a repository configured to store library code including entry points, a load instruction, a store instruction, and a sink. The load instruction performs: reading a first value using a first global identifier. The store instruction performs: writing a second value using a second global identifier. The system further includes a library analyzer, executing on the computer processor and configured to generate, by executing a first-order taint analysis on the library code starting at a sink, a first execution path from the load instruction to the sink, determine the store instruction by matching the load instruction and the store instruction, in response to matching the load instruction and the store instruction, generate a second execution path from the store instruction to the load instruction, generate, by executing the first-order taint analysis on the library code starting at the store instruction, a third execution path from an entry point to the store instruction, and form a potential second-order taint flow by joining the first execution path, the second execution path, and the third execution path.

In general, in one aspect, one or more embodiments relate to a method including identifying, in library code, load instructions each reading a value using a global identifier. The library code includes entry points. The method further includes generating, by executing a second-order taint analysis on the library code, execution paths from a subset of the entry points to the load instructions. The execution paths correspond to potential second-order taint flows. The method further includes: for each load instruction, recording a subset of the potential second-order taint flows to obtain recorded potential second-order taint flows for the respective load instruction. The second-order taint analysis performs: generating an execution path from the respective load instruction to a sink in the library code using the recorded potential second-order taint flows for the respective load instruction. Other aspects of the invention will be apparent from the following description and the appended claims.

DETAILED DESCRIPTION

Figure 1A:
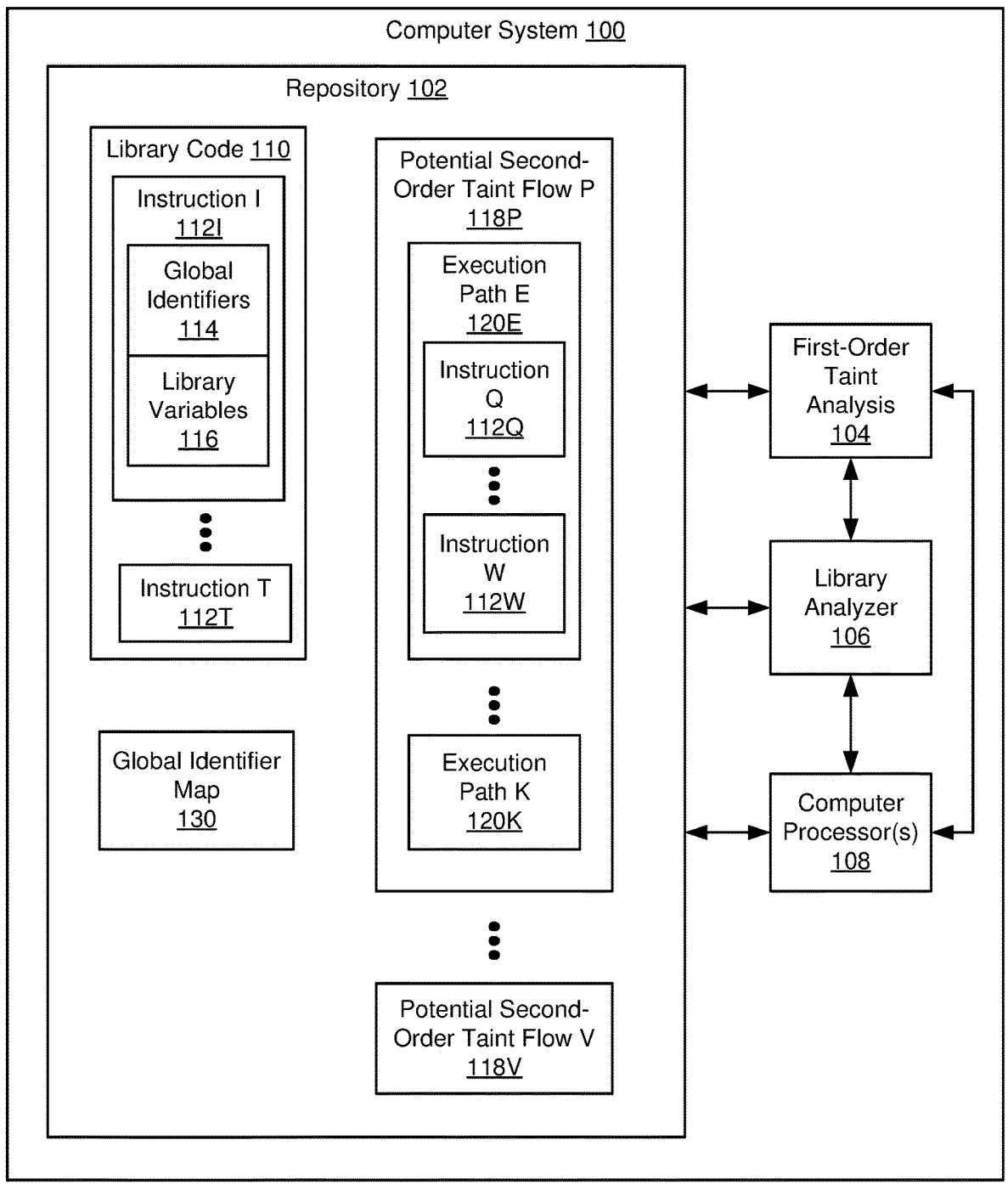
FIG. 1A, FIG. 1B, FIG. 1C, and FIG. 1D show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to detecting potential second-order taint flows in library code. In a potential second-order taint flow, tainted values may be: 1) written to an object attribute using a global identifier, 2) read from the object attribute using the global identifier, and 3) used in a sink. A global identifier may be an identifier of an object or attribute of an object that is defined external to the library code. For example, the global identifier may include an identifier of a table in a database and an identifier of a column of the table. A sink may be an instruction where a security-sensitive operation is performed.

A potential second-order taint flow is formed by joining a sequence of execution paths. Each execution path may include a sequence of instructions. One or more execution paths may be generated by executing a conventional first-order taint analysis on the library code. The first-order taint analysis detects potential first-order taint flows that do not involve flows of values referenced via global identifiers to objects defined external to the library code. The sequence of instructions in the joined execution paths may be alternating store instructions and load instructions that reference matching global identifiers. For example, a store instruction may write a value to an attribute of an object using a first global identifier and a load instruction may read the value from the attribute of the object using a second global identifier that matches the first global identifier.

The process for detecting potential second-order taint flows may be optimized to reduce execution time by pre-computing potential second-order taint flows to load instructions and then retrieving the precomputed potential second-order taint flows when the respective load instruction is analyzed.

FIG. 1A shows a computer system (100) in accordance with one or more embodiments of the invention. As shown in FIG. 1A, the computer system (100) includes a repository (102), a first-order taint analysis (104), a library analyzer (106), and computer processor(s) (108). In one or more embodiments, the computer system (100) takes the form of the computing system (500) described with respect to FIG. 5A and the accompanying description below or take the form of the client device (526) described with respect to FIG. 5B.

In one or more embodiments, the repository (102) is any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site. The repository (102) may be accessed online via a cloud service (e.g., Amazon Web Services, Egnyte, Azure, etc.).

In one or more embodiments, the repository (102) includes functionality to store library code (110), potential second-order taint flows (118P, 118V), and a global identifier map (130). The library code (110) is a collection of instructions (112I, 112T). An instruction (112I) is a statement written in a human-readable programming language, or intermediate representation (e.g., byte code). The library code (110) may be invoked by application code at one or more entry points. An entry point may be an instruction that receives input external to the library code (110). For example, an entry point may be a declaration of a function, method, or procedure where application code invokes the library code (110). Continuing this example, an entry point may implement an application programming interface (API) of the library code (110). The application code may be a collection of instructions external to the library code (110). An input value received at an entry point may be considered to be a potential taint source because the input value is generated external to the library code (110). For example, an input value received at an entry point may be provided by a user.

An instruction (112I) includes one or more global identifiers (114) and/or one or more library variables (116). A global identifier (114) may be an identifier of an object that is defined external to the library code (110). Alternatively, a global identifier (114) may be an identifier of an attribute of an object that is defined external to the library code (110). For example, the object may be defined as a global object or an external object. The object referenced by the global identifier (114) may persist beyond the termination of a function invoked at an entry point of the library code (110). In other words, the object referenced by the global identifier (114) may be accessed by multiple invocations of functions invoked at the entry points of the library code (110). For example, the object referenced by the global identifier (114) may be stored in persistent storage (e.g., persistent storage (506) of FIG. 5A). Continuing this example, the global identifier (114) may include an identifier of a table in a database and an identifier of a column of the table (e.g., where the column is an attribute of the table). The column identifier may be thought of as a variable in the sense that the column identifier may be used as a placeholder for the values of the cells of the column, analogous to a variable that functions as a placeholder for the possible values of the variable. As another example, the global identifier (114) may reference an attribute of an object (e.g., a session object) of a web application that persists beyond the invocations of functions at various entry points of the web application. That is, the web application, or any application code that includes multiple entry points that may be invoked by external code in arbitrary combinations, may be considered to be library code.

Figure 1B:
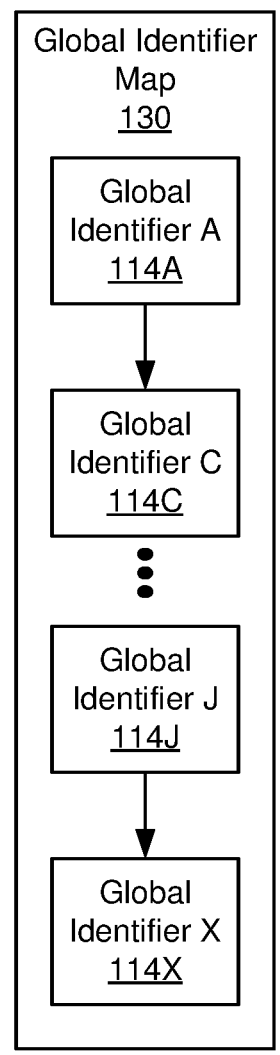

Turning to FIG. 1B, the global identifier map (130) is a structure that maps one global identifier to another global identifier. For example, global identifier A (114A) may be mapped to global identifier C (114C), global identifier J (114J) may be mapped to global identifier X (114X), etc. Continuing this example, global identifier C (114C) may be an identifier of a column of a table in a database and global identifier A (114A) may be an identifier of a column of a view generated from the table. The view may represent a virtual table generated from the table via a query. The global identifier map (130) may be used to map the identifier of the column in the view to the identifier of a column in the table. The global identifier map (130) may be used in determining whether one global identifier matches another global identifier (e.g., whether two global identifiers refer to the same column in the same table).

Returning to FIG. 1A, a library variable (116) may reference a location in the library code (110) where a value is stored, such as an allocation site. An allocation site may be an instruction (112I) in the library code (110) that declares, instantiates, and/or initializes an object. A library variable (116) may refer to a simple allocation site (e.g., a numerical or string value), may refer to a complex allocation site (e.g., a base object or structure containing one or more fields), or may refer to a field in a complex allocation site. The allocation site may contain different values at different points in time. In one or more embodiments, the allocation site may refer to a location in a memory (e.g., in non-persistent storage (504) of FIG. 5A) of the computer system (100) that is allocated when a function is invoked at an entry point of the library code (110). The location in the memory may be freed (e.g., reclaimed) when the function invoked at the entry point terminates.

The first-order taint analysis (104) is an analysis of the library code (110) that detects potential first-order taint flows. Potential first-order taint flows are taint flows that do not involve flows of values referenced via global identifiers to objects defined external to the library code (110). In one or more embodiments, the first-order taint analysis (104) uses the IFDS (Interprocedural Finite Distributive and Subset) approach that propagates access paths at a series of program points (e.g., instructions). Each access path includes a variable and zero or more field identifiers that refer to fields within an object referenced by the variable. The variable in the access path may be a global identifier (114). Alternatively, the variable in the access path may be a library variable (116). The first-order taint analysis (104) examines program points in a backward manner, starting from an exit point (e.g., return value) of a function until one or more entry points are reached in order to identify potential first-order taint flows between the entry points and exit points of one or more functions in a codebase. At each program point the first-order taint analysis (104) determines whether an access path may reference a tainted value. When the first-order taint analysis (104) encounters a call site, the analysis may be continued from the last instruction of the called function until the first instruction in the called function is reached. When a taint source is reached without encountering a sanitizer, then the first-order taint analysis (104) reports a potential first-order taint flow. A sanitizer is an instruction or function that transforms a potentially tainted value into a safe (e.g., trusted) value that is not associated with a taint flow. For example, a sanitizer may modify a value by encoding or replacing potentially dangerous characters with harmless equivalents. Continuing this example, the potentially dangerous characters may be filtered or escaped.

Continuing with FIG. 1A, a potential taint second-order flow (118P) includes a sequence of one or more execution paths (120E, 120K). An execution path (120E) includes a sequence of instructions (112Q, 112W). In one or more embodiments, an execution path includes one or more other execution paths. The sequence of instructions (112Q, 112W) may start with an entry point and may end with a sink. An entry point may be an instruction (112I) where an input value external to the library code (110) is received, and thus the input value may be considered to be a taint source. A sink may be an instruction (112I) where a security-sensitive operation is performed. The security-sensitive operation may access a security-sensitive resource of a computer system (100). Alternatively, the security-sensitive operation may be an operation that executes an arbitrary string as a command, such as an eval instruction. Alternatively, the sequence of instructions (112Q, 112W) may start with an entry point and may end with a store instruction that reads the tainted data received at the entry point. For example, data received at an entry point may subsequently be stored, by a store instruction, into an object referenced by a global identifier.

The library analyzer (106) includes functionality to identify potential second-order taint flows (118P, 118V) through attributes of objects referenced by global identifiers and/or library variables. For example, in a potential second-order taint flow (118P), tainted values may be:

1) written to an object attribute using a global identifier (114),
2) read from the object attribute using the global identifier (114), and
3) used in a sink.

Successive instructions in an execution path (120E) may reference matching global identifiers and/or matching library variables. The successive instructions in the execution path (120E) may be an alternating sequence of matching store instructions and load instructions (e.g., see description of FIG. 4A below). For example, a load instruction may write a value read from a first attribute of a first object to a library variable and a matching store instruction may read the value from the library variable written by the load instruction (see example below). Continuing this example, the store instruction may write the value to a second attribute of a second object using a global identifier and a matching load instruction may read the value from the second attribute of the second object using a global identifier that matches the global identifier used by the store instruction. For example, an execution path may include a sequence of the following Structured Query Language (SQL) instructions:

1) A load instruction that reads a value of an attribute of a first object "table1/column1" and writes the value to a library variable "v": SELECT column1 INTO v FROM table1, where "table1/column1" is a first global identifier, 2) A store instruction that reads the value of the library variable "v" and writes the value to an attribute of a second object "table2/column2": INSERT INTO table2(column2) VALUES v, where "table2/column2" is a second global identifier, and 3) A load instruction that reads the value of the attribute of the second object "table2/column2" and writes the value to a library variable "x": SELECT column2 INTO x FROM table2.

In the above example, a first-order taint analysis may determine that data flows from the library variable in the load instruction in 1) to the library variable in the store instruction in 2). Both the store instruction in 2) and the load instruction in 3) reference the same global identifier "table2/column2".

As another example, a value may be written to an attribute of a HyperText Transfer Protocol (HTTP) session object by calling an API setAttribute(attrName, value) (e.g., a store instruction) and the value of the attribute of the HTTP session object may be read by calling an API getAttribute (attrName) (e.g., a load instruction).

Figure 1C:
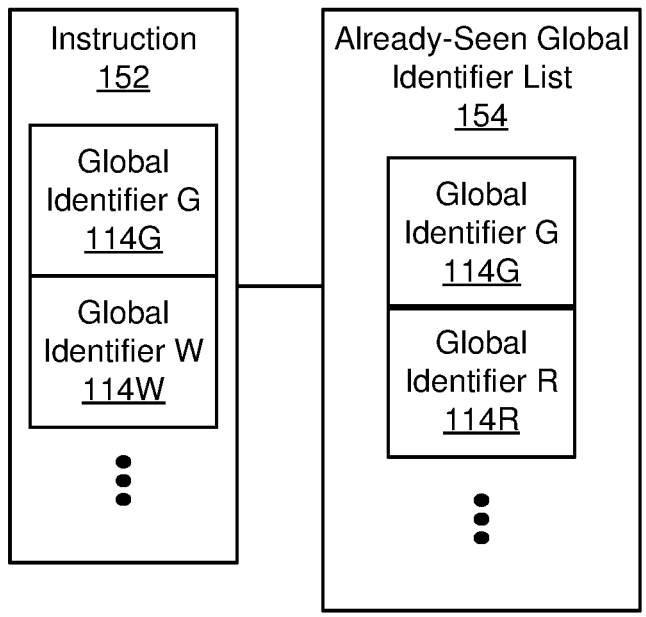

Turning to FIG. 1C, an instruction (152) may be associated with an already-seen global identifier list (154). The already-seen global identifier list (154) includes a list of one or more global identifiers (114G, 114R) that have already been processed by the library analyzer (106). The already-seen global identifier list (154) may be used as an optimization by the library analyzer (106) to determine whether an execution path is redundant. For example, the instruction (152) may be a store instruction that writes values using global identifiers (114G, 114W). Continuing this example, the library analyzer (106) may determine that an execution path corresponding to the instruction (152) and global identifier (114G) is redundant because global identifier (114G) is included in the already-seen global identifier list (154). Conversely, the taint analysis (104) may continue analyzing an execution path corresponding to the instruction (152) and global identifier (114W) because global identifier (114W) is excluded from the already-seen global identifier list (154).

Figure 1D:
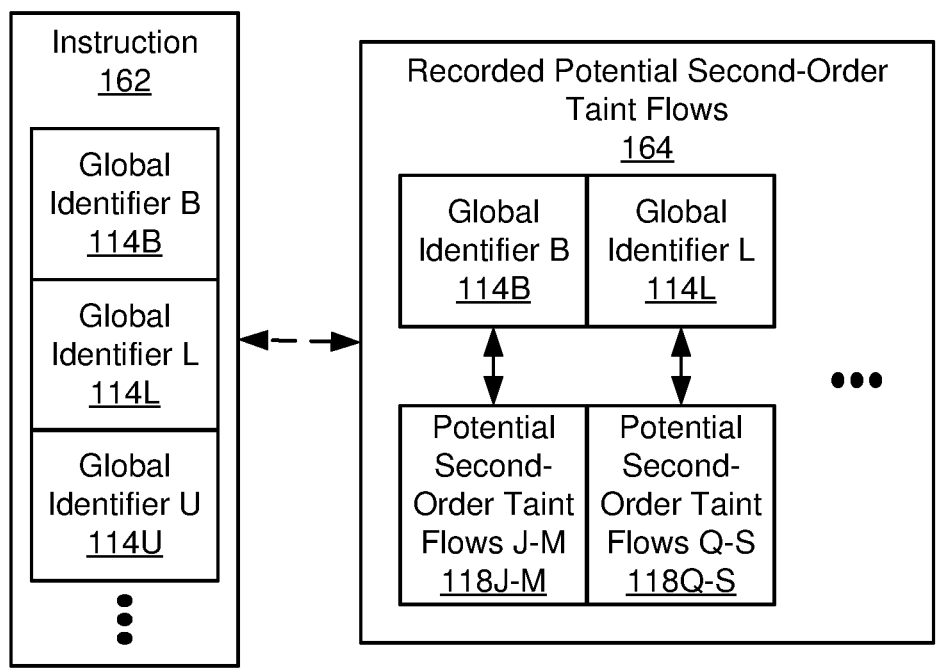

Turning to FIG. 1D, an instruction (162) may optionally correspond to recorded potential second-order taint flows (164). The recorded potential second-order taint flows (164) include potential second-order taint flows (118J-M, 118P-S) corresponding to global identifiers (114B, 114L). For example, the instruction (162) may be a load instruction that reads one or more values using global identifiers (114B, 114L, 114U). The recorded potential second-order taint flows (164) may be used in the implementation of an optimized, time-efficient version of a process for detecting potential second-order taint flows shown in FIG. 3 based on precomputing potential second-order taint flows (118J-M, 118P-S) corresponding to global identifiers (114B, 114L) used in an instruction (162). FIG. 1D further shows that the instruction (162) includes a global identifier U (114U) that has no corresponding potential second-order taint flows.

The library analyzer (106) includes functionality to generate a summary (140S) for a function (112F). The access path engine (104) includes functionality to extract a LHS access path (162) and/or a RHS access path (164) from an instruction (150). The library analyzer (106) includes functionality to determine an outgoing access path for an instruction using an incoming access path for the instruction. The library analyzer (106) includes functionality to determine whether one access path subsumes another access path.

In one or more embodiments, the computer processor(s) (108) takes the form of the computer processor(s) (502) described with respect to FIG. 5A and the accompanying description below. In one or more embodiments, the computer processor (108) includes functionality to execute the taint analysis (104) and the library analyzer (106).

While FIG. 1A, FIG. 1B, FIG. 1C, and FIG. 1D show a configuration of components, other configurations may be used without departing from the scope of the invention. For example, various components may be combined to create a single component. As another example, the functionality performed by a single component may be performed by two or more components.

Figure 2:
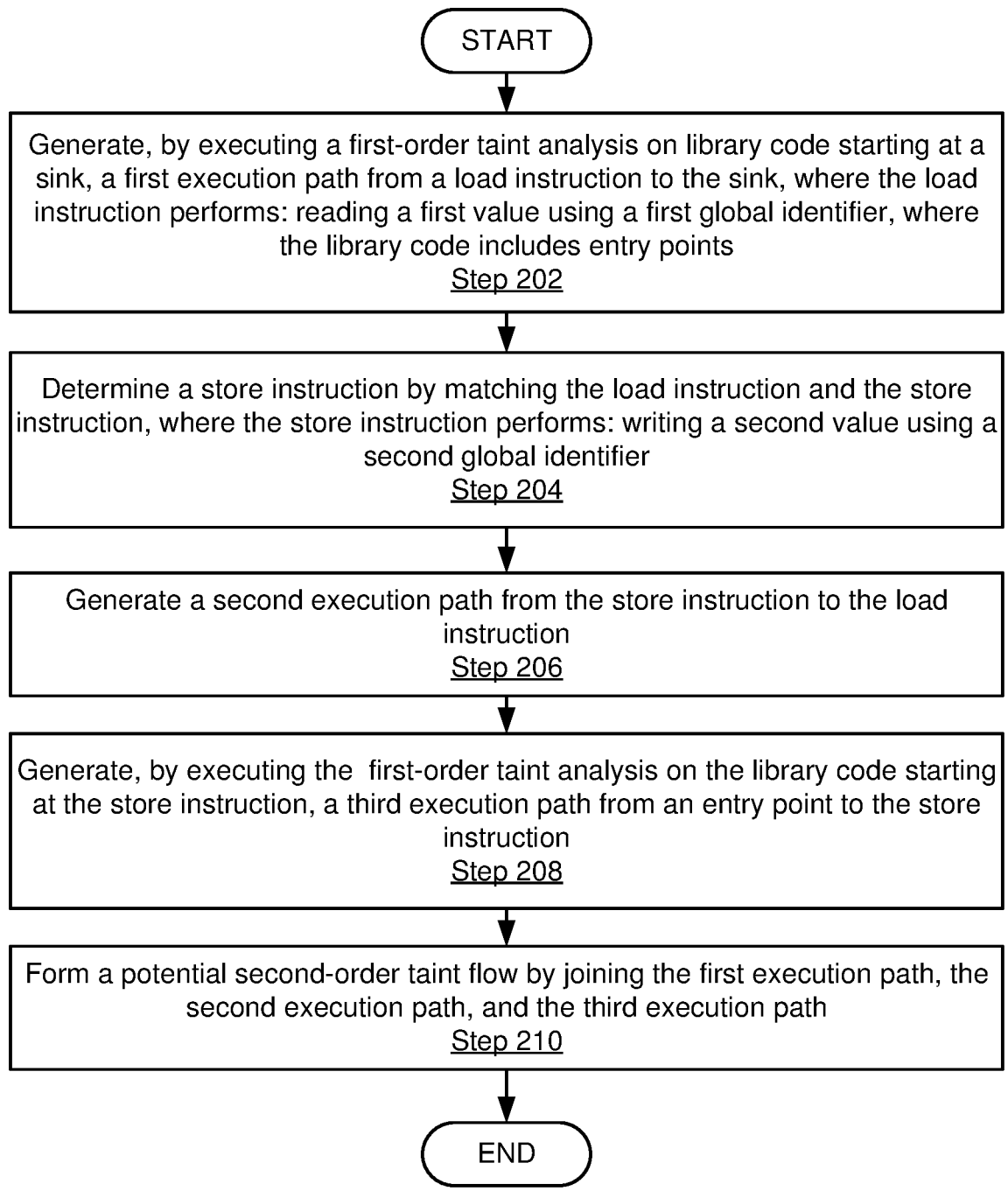
FIG. 2 and FIG. 3 show flowcharts in accordance with one or more embodiments of the invention.

FIG. 2 shows a flowchart in accordance with one or more embodiments of the invention. The flowchart depicts a process for executing a second-order taint analysis on library code. One or more of the steps in FIG. 2 may be performed by the components (e.g., the first-order taint analysis (104) and the library analyzer (106) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a first execution path from a first load instruction to a sink is generated by executing a first-order taint analysis on library code starting at the sink. The first load instruction reads a first value using a first global identifier. The first-order taint analysis may detect potential first-order taint flows by propagating access paths starting at the sink and reaching an entry point of the library code. In addition to detecting potential first-order taint flows, the first-order taint analysis may propagate access paths starting at the sink that reach one or more load instructions but fail to reach an entry point. The library analyzer records execution paths starting at the sink that reach the one or more load instructions. The first execution path from the first load instruction to the sink may be one of multiple execution paths from the one or more load instructions to the sink. In one or more embodiments, the first load instruction writes the first value to a first library variable, and the sink reads the first value from the first library variable. For example, the first load instruction may be load instruction B (406B) of FIG. 4B, the sink may be sink (408) of FIG. 4B, and the library variable may be library variable C (430C) of FIG. 4B. Alternatively, the sink may read the first value from a second library variable that is an alias of the first library variable.

In Step 204, a first store instruction is determined by matching the first load instruction and the first store instruction. The first store instruction writes a second value using a second global identifier. For example, the first store instruction may be store instruction B (404B) of FIG. 4B. The first store instruction may be one of many store instructions determined by the library analyzer to match the first load instruction. In one or more embodiments, the library analyzer matches the first load instruction and the first store instruction by matching the first global identifier and the second global identifier. For example, both the first global identifier and the second global identifier may include the same identifier of a table in a database and the same identifier of a column of the table. Continuing this example, both load instruction B (406B) and store instruction B (404B) of FIG. 4B reference the same global identifier B "t2/c2" (420B). Alternatively, the library analyzer may match the first load instruction and the first store instruction by determining that the first global identifier is included in a view generated from a table that is mapped to a third global identifier by a global identifier map. That is, the library analyzer may resolve the first global identifier to a third global identifier using the global identifier map. The library analyzer may then match the third global identifier to the second global identifier. In one or more embodiments, the library analyzer resolves global identifiers included in the global identifier map prior to executing the taint analysis. In one or more embodiments, the first value from Step 202 above and the second value from Step 204 are the same. Alternatively, the first value from Step 202 above and the second value from Step 204 may be different.

In one or more embodiments, the library analyzer associates, with each of the store instructions, an already-seen global identifier list. The library analyzer adds the first global identifier (e.g., the global identifier referenced by both the first load instruction and the store instructions matching the first load instruction) to the already-seen global identifier list of each of the store instructions matching the first load instruction to indicate that the first global identifier has already been processed by the library analyzer. The library analyzer may use the already-seen global identifier list as described below as an optimization to avoid exploring redundant (e.g., cyclical) execution paths.

In Step 206, a second execution path is generated from the first store instruction to the first load instruction in response to matching the first load instruction and the first store instruction. The library analyzer may generate the second execution path from the first store instruction to the first load instruction based on determining that both the first store instruction and the first load instruction reference matching global identifiers, indicating that a value written by the first store instruction may be read by the first load instruction.

In Step 208, a third execution path from a first entry point to the first store instruction is generated by executing the first-order taint analysis on the library code starting at the first store instruction (see description of Step 202 above). The third execution path may be one of many execution paths from an entry point to the first store instruction generated by executing the first-order taint analysis on the library code starting at the first store instruction.

In Step 210, a potential taint flow is formed by joining the first execution path, the second execution path, and the third execution path. The library analyzer may report the potential taint flow (e.g., to an end-user or a developer). The library analyzer may concatenate the third execution path, the second execution path, and the first execution path in a sequence that starts with the first entry point and ends with the sink.

Executing the first-order taint analysis in Step 208 above may propagate access paths starting at the first store instruction that reach one or more additional load instructions but fail to reach an entry point. The library analyzer records execution paths starting at the first store instruction that reach the additional load instructions. The library analyzer may generate additional potential second-order taint flows corresponding to execution paths that include the additional load instructions by iteratively executing the process of FIG. 2. Each iteration of the process of FIG. 2 may correspond to reading and writing potentially tainted data using global identifiers. The number of iterations may be proportional to the number of sinks in the library code and the number of global identifiers (e.g., the number of columns (attributes) in a database referenced by the library code).

For example, the library analyzer may re-execute Step 202 above to generate a fourth execution path from a second load instruction of the additional load instructions to the first store instruction, wherein the second load instruction reads a third value using a third global identifier. Continuing the example from Step 204 above, the second load instruction may be load instruction A (406A) of FIG. 4B. Next, the library analyzer may re-execute Step 204 above to determine a second store instruction by matching the second load instruction and the second store instruction. The second store instruction may write the third value using the third global identifier. For example, the second store instruction may be store instruction A (404A) of FIG. 4B. Continuing this example, both load instruction A (406A) and store instruction A (404A) of FIG. 4B reference the same global identifier A "t1/c1" (420A). In addition, the library analyzer associates, with the second store instruction, an already-seen global identifier list that includes the third identifier (e.g., the global identifier referenced by both the second load instruction and the second store instruction).

The library analyzer also determines whether the third identifier is excluded from the already-seen global identifier list associated with the first store instruction. For example, an execution path from the second store instruction to the second load instruction may be redundant if the global identifier upon which the second store instruction and the second load instruction are matched was already processed by the library analyzer when analyzing the first store instruction, as indicated in the already-seen global identifier list associated with the first store instruction. If the library analyzer determines that the third identifier is excluded from the already-seen global identifier list associated with the first store instruction, then the library analyzer may re-execute Step 206 above to generate a fifth execution path from the second store instruction to the second load instruction.

Next, the library analyzer may re-execute Step 208 above to generate, by executing the first-order taint analysis on the library code starting at the second store instruction, a sixth execution path from a second entry point to the second store instruction. And finally, the library analyzer may re-execute Step 210 above to form a second potential taint flow by joining the first execution path, the second execution path, the fourth execution path, the second fifth path, and the sixth execution path.

Figure 3:
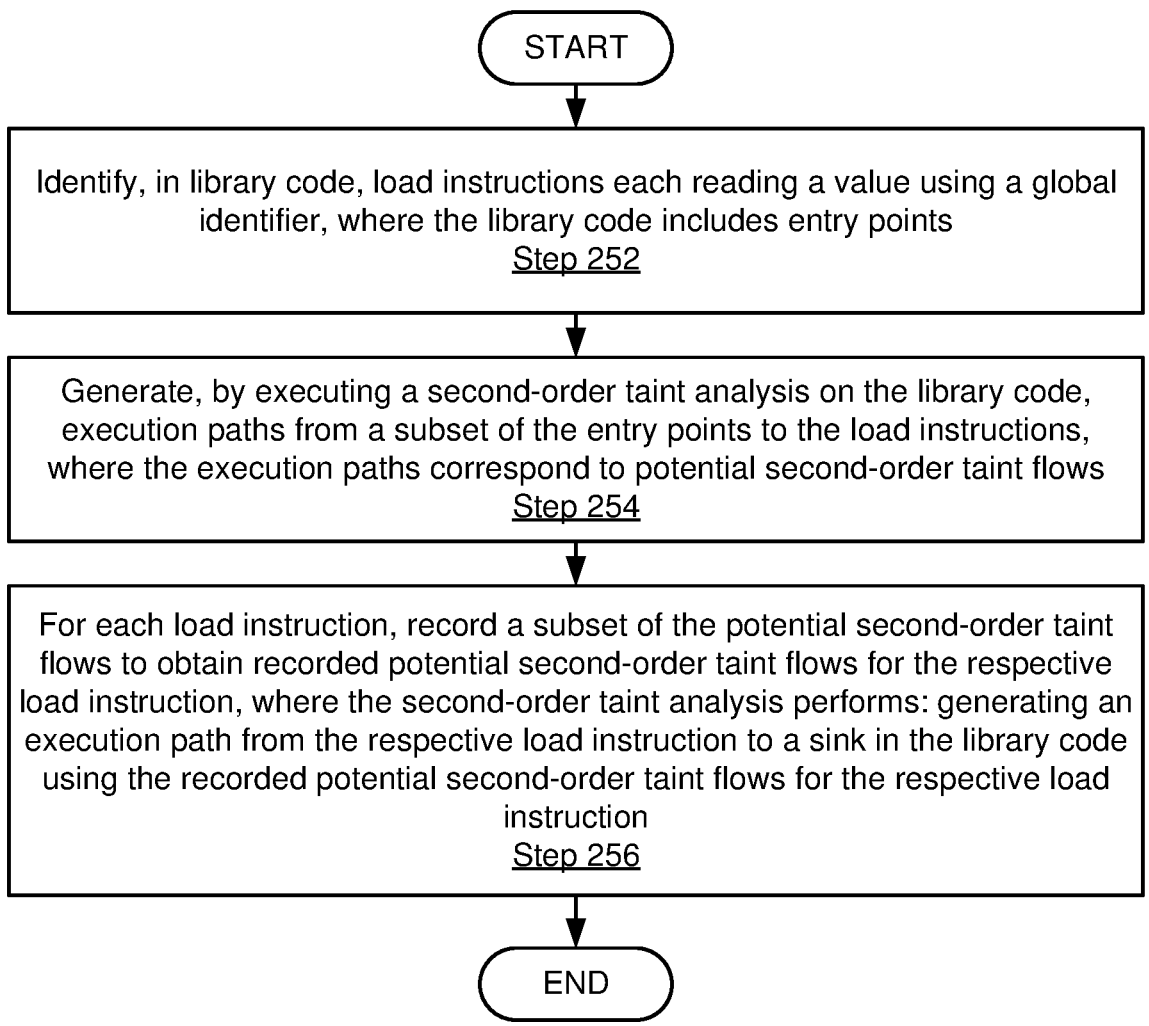

FIG. 3 shows a flowchart in accordance with one or more embodiments of the invention. The flowchart depicts a process for executing a second-order taint analysis on library code. Moreover, the process of FIG. 3 may be a time-optimized version of the process of FIG. 2. One or more of the steps in FIG. 3 may be performed by the components (e.g., the first-order taint analysis (104) and the library analyzer (106) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 252, load instructions each reading a value using a global identifier are identified in library code. The library analyzer may identify the load instructions by querying the library code. For example, the query may be based on the syntax of one or more programming languages used in the library code. Continuing this example, the query may request all SQL SELECT instructions the library code. Alternatively or additionally, the library analyzer may perform a points-to analysis to identify identifiers in the library code that may read a value from an object in persistent memory (e.g., a heap memory) that may persist beyond the termination of functions invoked at entry points of the library code.

In Step 254, execution paths from a subset of the entry points of the library code to the load instructions are generated by executing a second-order taint analysis on the library code starting at the load instructions. The second-order taint analysis is described by FIG. 2 above. Each load instruction identified in the library code in Step 252 above may be used as the "sink" provided to the first-order taint analysis in Step 202 above. The execution paths correspond to potential second-order taint flows from the subset of the entry points of the library code to the load instructions.

In Step 256, a subset of the potential taint flows for each load instruction is recorded to obtain recorded potential taint flows for the respective load instruction. Each potential taint flow corresponds to a global identifier referenced in the respective load instruction. The second-order taint analysis generates an execution path from the respective load instruction to a sink in the library code using the recorded potential taint flows for the respective load instruction. That is, the second-order taint analysis may be optimized to retrieve the recorded potential taint flows for the respective load instruction instead of executing a first-order taint analysis on the library code (e.g., see description of Step 202 and Step 208 above).

Figure 4A:
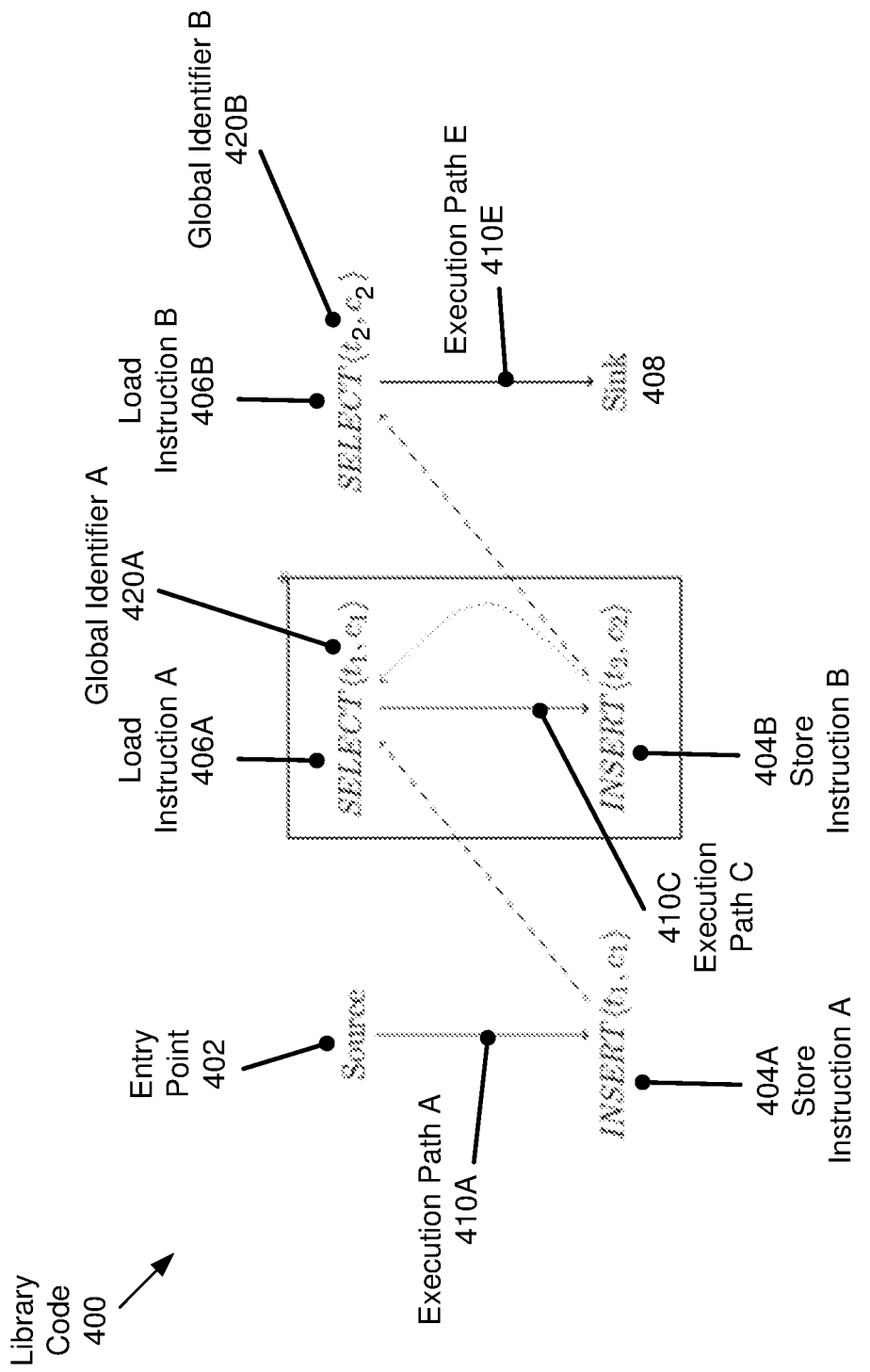
FIG. 4A and FIG. 4B show examples in accordance with one or more embodiments of the invention.
Figure 4B:
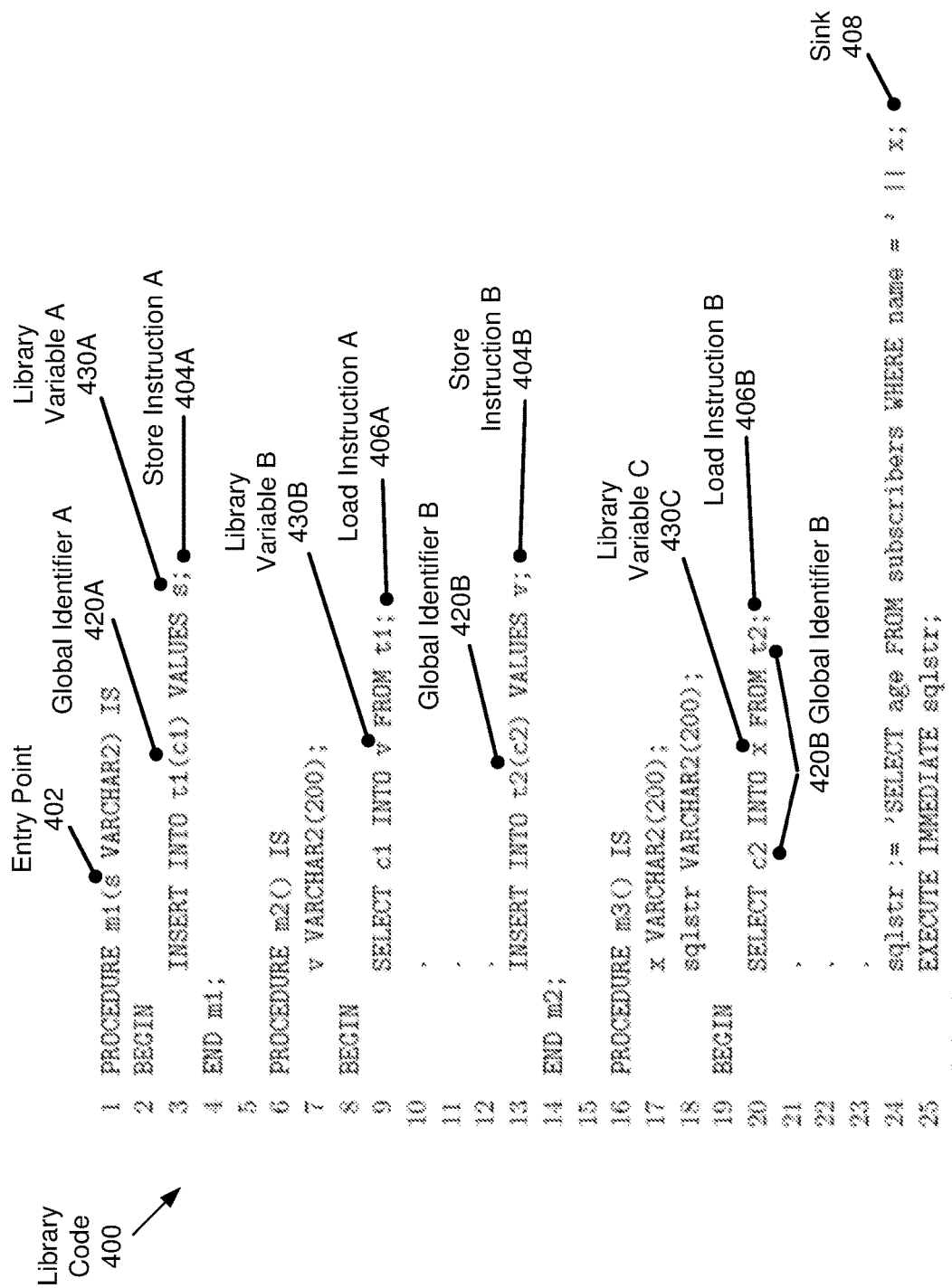

FIG. 4A and FIG. 4B show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 4A shows a diagram of library code (400) ((110) in FIG. 1A) that includes instructions (402, 404A, 404B, 406A, 406B, 408) ((112I, 112T, 112Q, 112W) in FIG. 1A, (152) in FIG. 1B, and (162) in FIG. 1C). FIG. 4A shows the execution paths (410A, 410C, 410E) ((120E, 120K) in FIG. 1A) generated by the library analyzer while analyzing the library code (400). FIG. 4B shows the syntax of the instructions (402, 404A, 404B, 406A, 406B, 408) in the library code (400).

The library analyzer begins its analysis of the library code (400) at a sink (408) that is used in a security-sensitive operation. In this case, the sink (408) executes a string as a command, as shown in FIG. 4B. The command includes library variable C "x" (430C), which may be a tainted value. The library analyzer generates, by executing a first-order taint analysis on the library code (400) starting at the sink (408), execution path E (410E) from the sink (408) to load instruction B (406B). The library analyzer generates execution path E (410E) based on:

1) the first-order taint analysis detecting a flow from a value read using global identifier B "t2/c2" (420B) and written to library variable C "x" (430C) by load instruction B (406B), and 2) the first-order taint analysis detecting that the sink (408) reads the value of library variable C "x" (430C).

The library analyzer continues its analysis of the library code (400) at load instruction B (406B). The library analyzer matches load instruction B (406B) and store instruction B (404B) by determining that both load instruction B (406B) and store instruction B (404B) reference the same the global identifier B "t2/c2" (420B). That is, load instruction B (406B) reads a value using global identifier B "t2/c2" (420B) and store instruction B (404B) writes a value using global identifier B "t2/c2" (420B).

The library analyzer continues its analysis of the library code (400) at store instruction B (404B), which becomes a "sink" provided to the first-order taint analysis. The library analyzer generates, by executing the first-order taint analysis on the library code (400) starting at store instruction B (404B), execution path C (410C) from store instruction B (404B) to load instruction A (406A). The library analyzer generates execution path C (410C) based on:

1) the first-order taint analysis detecting a flow from a value read using global identifier B "t1/c1" (420A) and written to library variable B "v" (430B) by load instruction A (406A), and 2) the first-order taint analysis detecting that store instruction B (404B) reads the value of library variable B "v" (430B).

The library analyzer continues its analysis of the library code (400) at load instruction A (406A). The library analyzer matches load instruction A (406A) and store instruction A (404A) by determining that both load instruction A (406A) and store instruction A (404A) reference the same the global identifier B "t1/c1" (420A). That is, load instruction A (406A) reads a value using global identifier B "t1/c1" (420A) and store instruction A (404A) writes a value using global identifier B "t1/c1" (420A).

The library analyzer continues its analysis of the library code (400) at store instruction A (404A), which becomes a "sink" provided to the first-order taint analysis. The library analyzer generates, by executing the first-order taint analysis on the library code (400) starting at store instruction A (404A), execution path A (410A) from store instruction A (404A) to the entry point (402) receiving the tainted value. The library analyzer generates execution path A (410A) based on the first-order taint analysis detecting a flow from library variable A "s" (430A) read by store instruction A (404A), where library variable A "s" (430A) receives the tainted value at the entry point (402).

The library analyzer then forms a potential second-order taint flow by joining the aforementioned execution paths (410A, 410C, 410E). The potential second-order taint flow may occur due to an application invoking the library code (400) at the entry point (402), resulting in the execution of execution path A (410A), execution path C (410C), and execution path E (410E) in sequence.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
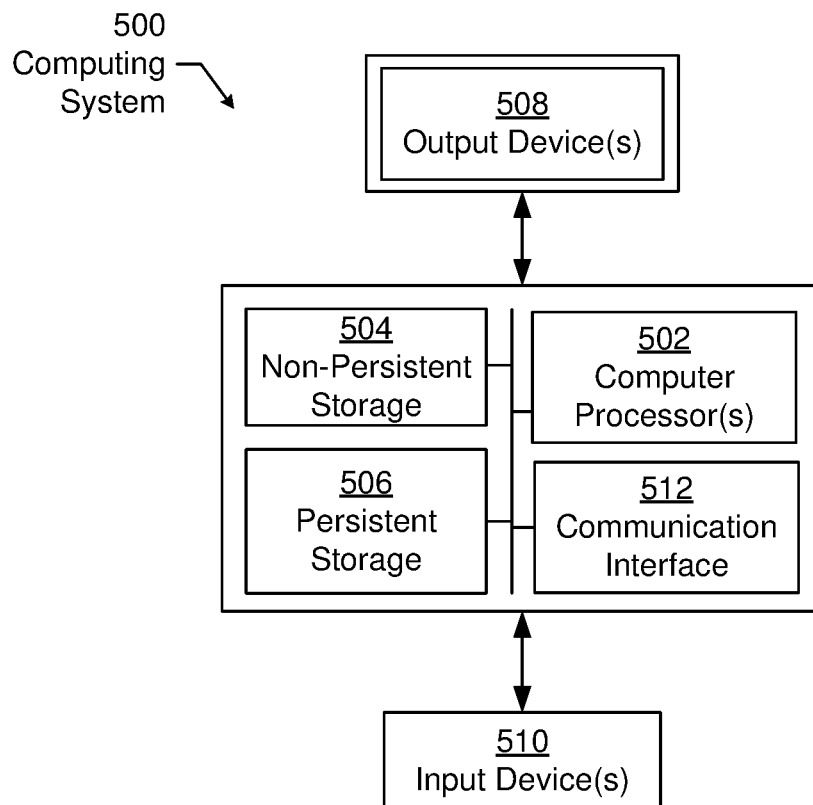
FIG. 5A and FIG. 5B show computing systems in accordance with one or more embodiments of the invention.
Figure 5B:
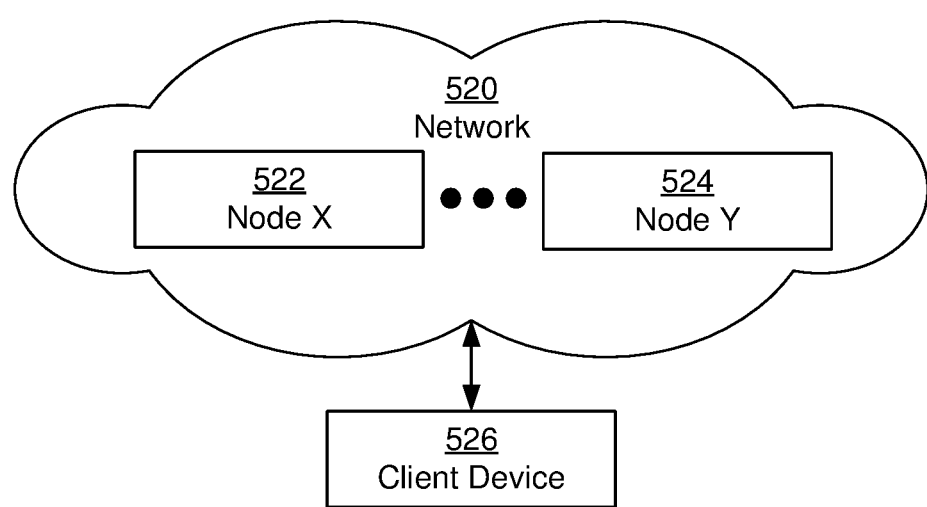

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, reorganization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing a second-order taint analysis on library code, comprising:
   generating, by executing a first-order taint analysis on the library code starting at a sink, a first execution path from a first load instruction to the sink, wherein the first load instruction performs: reading a first value using a first global identifier, and wherein the library code comprises a plurality of entry points;

determining a first store instruction of one or more store instructions by matching the first load instruction and the first store instruction, wherein the first store instruction performs: writing a second value using a second global identifier;

in response to matching the first load instruction and the first store instruction, generating a second execution path from the first store instruction to the first load instruction;

generating, by executing the first-order taint analysis on the library code starting at the first store instruction, a third execution path from a first entry point of the plurality of entry points to the first store instruction; and forming a first potential second-order taint flow by joining the first execution path, the second execution path, and the third execution path.

2. The method of claim 1, wherein matching the first load instruction and the first store instruction comprises:
matching the first global identifier and the second global identifier.

3. The method of claim 1, wherein matching the first load instruction and the first store instruction comprises:
determining that the first global identifier is mapped to a third global identifier; and
matching the third global identifier and the second global identifier.

4. The method of claim 1, further comprising:
in response to executing the first-order taint analysis on the library code starting at the first store instruction, generating a fourth execution path from a second load instruction to the first store instruction, wherein the second load instruction performs: reading a third value using a third global identifier;
determining a second store instruction by matching the second load instruction and the second store instruction, wherein the second store instruction performs: writing the third value using the third global identifier;
in response to matching the second load instruction and the second store instruction, generating a fifth execution path from the second store instruction to the second load instruction;
generating, by executing the first-order taint analysis on the library code starting at the second store instruction, a sixth execution path from a second entry point of the plurality of entry points to the second store instruction; and
forming a second potential second-order taint flow by joining the first execution path, the second execution path, the fourth execution path, the second fifth path, and the sixth execution path.

5. The method of claim 4, further comprising:
associating, with each of the one or more store instructions, an already-seen global identifier list;
adding the first global identifier to the already-seen global identifier list; and
in response to matching the second load instruction and the second store instruction, determining that the third global identifier is excluded from the already-seen global identifier list associated with the first store instruction,
wherein the fifth execution path is generated in response to determining that the third global identifier is excluded from the already-seen global identifier list associated with the first store instruction.

6. The method of claim 1, wherein the first global identifier comprises an identifier of a table in a database and an identifier of a column of the table.

7. The method of claim 1, wherein the first global identifier comprises an identifier of an object and an identifier of an attribute of the object, and wherein the object is generated in response to application code invoking the library code at one of the plurality of entry points.

8. A system comprising:
a computer processor;
a repository configured to store library code comprising a plurality of entry points, a first load instruction, a first store instruction of one or more store instructions, and a sink, wherein the first load instruction performs: reading a first value using a first global identifier, and wherein the first store instruction performs: writing a second value using a second global identifier; and
a library analyzer, executing on the computer processor and configured to:
generate, by executing a first-order taint analysis on the library code starting at the sink, a first execution path from the first load instruction to the sink,
determine the first store instruction by matching the first load instruction and the first store instruction,
in response to matching the first load instruction and the first store instruction, generate a second execution path from the first store instruction to the first load instruction,
generate, by executing the first-order taint analysis on the library code starting at the first store instruction, a third execution path from a first entry point of the plurality of entry points to the first store instruction, and
form a first potential second-order taint flow by joining the first execution path, the second execution path, and the third execution path.

9. The system of claim 8, wherein the library analyzer is further configured to match the first load instruction and the first store instruction by:
matching the first global identifier and the second global identifier.

10. The system of claim 8, wherein the library analyzer is further configured to match the first load instruction and the first store instruction by:
determining that the first global identifier is mapped to a third global identifier,
matching the third global identifier and the second global identifier.

11. The system of claim 8, wherein the library analyzer is further configured to:
in response to executing the first-order taint analysis on the library code starting at the first store instruction, generate a fourth execution path from a second load instruction to the first store instruction, wherein the second load instruction performs: reading a third value using a third global identifier,
determine a second store instruction by matching the second load instruction and the second store instruction, wherein the second store instruction performs: writing the third value using the third global identifier,
in response to matching the second load instruction and the second store instruction, generate a fifth execution path from the second store instruction to the second load instruction,
generate, by executing the first-order taint analysis on the library code starting at the second store instruction, a sixth execution path from a second entry point of the plurality of entry points to the second store instruction, and form a second potential second-order taint flow by joining the first execution path, the second execution path, the fourth execution path, the second fifth path, and the sixth execution path.

12. The system of claim 11, wherein the library analyzer is further configured to:
associate, with each of the one or more store instructions, an already-seen global identifier list,
add the first global identifier to the already-seen global identifier list, and
in response to matching the second load instruction and the second store instruction, determine that the third global identifier is excluded from the already-seen global identifier list associated with the first store instruction,
wherein the fifth execution path is generated in response to determining that the third global identifier is excluded from the already-seen global identifier list associated with the first store instruction.

13. The system of claim 8, wherein the first global identifier comprises an identifier of a table in a database and an identifier of a column of the table.

14. The system of claim 8, wherein the first global identifier comprises an identifier of an object and an identifier of an attribute of the object, and wherein the object is generated in response to application code invoking the library code at one of the plurality of entry points.

15. A method comprising:
identifying, in library code, a plurality of load instructions each reading a value using a global identifier, wherein the library code comprises a plurality of entry points;
generating, by executing a second-order taint analysis on the library code, a plurality of execution paths from a subset of the plurality of entry points to the plurality of load instructions, wherein the plurality of execution paths correspond to a plurality of potential second-order taint flows; and
for each of the plurality of load instructions, recording a subset of the plurality of potential second-order taint flows to obtain recorded potential second-order taint flows for the respective load instruction, wherein the second-order taint analysis performs: generating an execution path from the respective load instruction to a sink in the library code using the recorded potential second-order taint flows for the respective load instruction.

16. The method of claim 15, wherein the second-order taint analysis further performs:
generating, by executing a first-order taint analysis on the library code starting at a first load instruction of the plurality of load instructions, a first execution path from a first entry point of the plurality of entry points to the first load instruction, wherein the first load instruction performs: reading a first value using a first global identifier;
determining a first store instruction of one or more store instructions by matching the first load instruction and the first store instruction, wherein the first store instruction performs: writing a second value using a second global identifier;
in response to matching the first load instruction and the first store instruction, generating a second execution path from the first store instruction to the first load instruction;
generating, by executing the first-order taint analysis on the library code starting at the first store instruction, a third execution path from a first entry point of the plurality of entry points to the first store instruction; and
forming a first potential second-order taint flow by joining the first execution path, the second execution path, and the third execution path.

17. The method of claim 15, wherein matching the first load instruction and the first store instruction comprises:
matching the first global identifier and the second global identifier.

18. The method of claim 15, wherein the second-order taint analysis further performs:
in response to executing the first-order taint analysis on the library code starting at the first store instruction, generating a fourth execution path from a second load instruction to the first store instruction, wherein the second load instruction performs: reading a third value using a third global identifier;
determining a second store instruction by matching the second load instruction and the second store instruction, wherein the second store instruction performs: writing the third value using the third global identifier;
in response to matching the second load instruction and the second store instruction, generating a fifth execution path from the second store instruction to the second load instruction;
generating, by executing the first-order taint analysis on the library code starting at the second store instruction, a sixth execution path from a second entry point of the plurality of entry points to the second store instruction; and
forming a second potential second-order taint flow by joining the first execution path, the second execution path, the fourth execution path, the second fifth path, and the sixth execution path.

19. The method of claim 18, wherein the second-order taint analysis further performs:
associating, with each of the one or more store instructions, an already-seen global identifier list;
adding the first global identifier to the already-seen global identifier list; and
in response to matching the second load instruction and the second store instruction, determining that the third global identifier is excluded from the already-seen global identifier list associated with the first store instruction,
wherein the fifth execution path is generated in response to determining that the third global identifier is excluded from the already-seen global identifier list associated with the first store instruction.

20. The method of claim 15, wherein the first global identifier comprises an identifier of a table in a database and an identifier of a column of the table.

* * * * *

UNITED STATES PATENT AND TRADEMARK OFFICE
CERTIFICATE OF CORRECTION

PATENT NO. : 11,586,740 B2
APPLICATION NO. : 17/163193
DATED : February 21, 2023
INVENTOR(S) : Ramesh et al.

Page 1 of 1

It is certified that error appears in the above-identified patent and that said Letters Patent is hereby corrected as shown below:

In the Claims

In Column 15, Line 52, in Claim 4, delete "second fifth" and insert -- fifth execution --, therefor.

Signed and Sealed this
Second Day of January, 2024

Katherine Kelly Vidal
*Director of the United States Patent and Trademark Office*